(12) United States Patent
Mallick et al.

(10) Patent No.: US 12,555,261 B2
(45) Date of Patent: Feb. 17, 2026

(54) METHOD AND SYSTEM FOR DETECTING AND CORRECTING ORIENTATION OF DOCUMENT IMAGES

(71) Applicant: L&T TECHNOLOGY SERVICES LIMITED, Chennai (IN)

(72) Inventors: Triptesh Mallick, Bankura (IN); Tarun Kumar Das, Digboi (IN); Madhusudan Singh, Bangalore (IN); Pragyesh Kumar, Agra (IN)

(73) Assignee: L&T TECHNOLOGY SERVICES LIMITED, Chennai (IN)

( * ) Notice: Subject to any disclaimer, the term of this patent is extended or adjusted under 35 U.S.C. 154(b) by 382 days.

(21) Appl. No.: 18/120,364

(22) Filed: Mar. 11, 2023

(65) Prior Publication Data

US 2024/0177332 A1 May 30, 2024

(30) Foreign Application Priority Data

Nov. 24, 2022 (IN) .............................. 202241067670

(51) Int. Cl.
*G06T 7/70* (2017.01)
*G06T 3/60* (2024.01)
(Continued)

(52) U.S. Cl.
CPC .................. *G06T 7/70* (2017.01); *G06T 3/60* (2013.01); *G06V 30/19013* (2022.01); *G06V 30/414* (2022.01); *G06T 2207/30176* (2013.01)

(58) Field of Classification Search
CPC ... G06T 7/70; G06T 3/60; G06T 2207/30176; G06V 30/19013; G06V 30/414
See application file for complete search history.

(56) References Cited

U.S. PATENT DOCUMENTS

| 6,151,423 A | 11/2000 | Melen |
| 6,993,205 B1 | 1/2006 | Lorie et al. |

(Continued)

FOREIGN PATENT DOCUMENTS

| CN | 111260569 A | 6/2020 |
| JP | 2011010033 A | * 1/2011 |

OTHER PUBLICATIONS

Wang, Yuxin, et al. "Contournet: Taking a further step toward accurate arbitrary-shaped scene text detection." IEEE, published 2020 (Year: 2020).*

*Primary Examiner* — Ross Varndell
*Assistant Examiner* — Nhut Huy Pham
(74) *Attorney, Agent, or Firm* — Kendal M. Sheets (57) ABSTRACT

This disclosure relates to method and system for detecting orientation. The method includes detecting a plurality of regions in a document image, each region including text data, and determining positional information of each of the regions; for each of the plurality of regions, determining a region orientation to be one of first orientation or second orientation based on height and width of the region; determining a ratio of number of regions having first orientation and number of regions having second orientation; determining page orientation of the image as third orientation or second orientation, or rotating the image by 90° in counter-clockwise direction based on the ratio; determining first optical character recognition (OCR) data and second OCR data corresponding to the image and the image rotated by 180°, respectively; and determining number of correct words in first OCR data and second OCR data based on comparison with dictionary data.

12 Claims, 5 Drawing Sheets

(51) Int. Cl.
*G06V 30/146* (2022.01)
*G06V 30/19* (2022.01)
*G06V 30/414* (2022.01)

(56) References Cited

U.S. PATENT DOCUMENTS

| | | | |
|---|---|---|---|
| 7,194,144 B1* | 3/2007 | Sakai | H04N 1/3876 |
| | | | 382/284 |
| 8,175,388 B1 | 5/2012 | Fisher | |
| 11,151,372 B2 | 10/2021 | Kakrana et al. | |
| 2013/0177201 A1* | 7/2013 | Fisher | G06V 30/1463 |
| | | | 382/103 |
| 2017/0161580 A1* | 6/2017 | Chulinin | G06V 30/1463 |
| 2023/0135212 A1* | 5/2023 | Bhaskar | G06V 30/40 |
| | | | 382/159 |

* cited by examiner

METHOD AND SYSTEM FOR DETECTING AND CORRECTING ORIENTATION OF DOCUMENT IMAGES

TECHNICAL FIELD

This disclosure relates generally to image processing, and more particularly to a system and a method for detecting orientation of a document image.

BACKGROUND

Documents may be scanned in any orientation and may comprise of text in various formats such as in tables, free text, drawings/figures, maps, logos, signatures, etc. In order to make the scanned documents searchable and editable, text is required to be recognized. Several Optical Character Recognition (OCR) algorithms are generally available to extract the text in a document and make the document image text recognizable and editable. However, the accuracy of the text extracted from the scanned documents or any documents depends greatly on the orientation of the text in the document. If the document image is provided in a rotated orientation (for example, one of 90°, 180°, or 270° degree orientations), the text in the image also appears in a rotated orientation and therefore, accuracy in OCR prediction of the document image is less in comparison to that of a document image with correct text orientation (i.e., 0° orientation).

The conventional methods lack a mechanism to identify an orientation of text in a document image and to rectify the orientation of document image when it is incorrect. There is, therefore, a need in present state of art for techniques to identify and rectify the orientation of a page to allow accurate text data extraction from an input image.

SUMMARY OF THE INVENTION

In one embodiment, a method of detecting orientation of a document image using a computing device is provided. The method may include detection of a plurality of regions in the document image. In an embodiment, the plurality of regions may include text data. In an embodiment, positional information of each of the regions may be determined. In an embodiment, the positional information may comprise of x and y coordinates of a top left corner and width and height information of each of the plurality of regions. A region orientation of each of the plurality of regions may be determined as that of a first orientation or a second orientation based on if the height of a region is greater than three times the width of the region or the width of the region is greater than three times the height of the region respectively. A region orientation is determined for each of the plurality of regions detected. In an embodiment, the region of orientation may be of a first orientation or a second orientation. In an embodiment, a region may be determined to have a first orientation if height of a region is greater than three times width of the region. In an embodiment, a region may be determined to have a second orientation if the width of the region is greater than three times the height of the region. The computing device then, may determine a ratio of a number of regions determined as having the first orientation and a number of regions determined as having the second orientation. A page orientation of the document image may be determined as a third orientation or the second orientation if the ratio is greater than a pre-defined or pre-determined threshold. In an embodiment, the page orientation of the document image may be determined as a third orientation or the second orientation if the number of regions determined as having the first orientation is equal to zero. In case the ratio is less than the pre-determined threshold or if the number of regions determined as having the second orientation is equal to zero, then the document image may be rotated by 90 degrees in a counter-clockwise direction. A first OCR data may be determined by performing optical character recognition (OCR) of each of the regions of the document image. A second OCR data may be determined by performing optical character recognition (OCR) of each of the regions of the document image which has been rotated by 180 degrees. The method may further include determining a number of correct words in each of the first OCR data and the second OCR data based on a comparison with a dictionary data. The method may further include determining the page orientation as the third orientation if the number of correct words in the first OCR data is greater than the number of correct words in the second OCR data. The method may further include rotating the image by 180 degrees if the number of correct words in the first OCR data is less than the number of correct words in the second OCR data.

In one embodiment, a system for detecting orientation of a document image is disclosed. In one example, the system may include a processor and a memory communicatively coupled to the processor. The memory may store processor-executable instructions, which when executed by the processor, may cause the processor to detect a plurality of regions in the document image. In an embodiment, the plurality of regions may include text data. The processor-executable instructions, when executed by the processor, may further cause the processor to determine positional information of each of the regions. The positional information may include x and y coordinates of a top left corner, width and height of each of the plurality of regions. For each of the plurality of regions, the processor-executable instructions, when executed by the processor, may further cause the processor to determine a region orientation to be one of a first orientation if height of a region is greater than three times width of the region, or a second orientation if the width of the region is greater than three times the height of the region. The processor-executable instructions, when executed by the processor, may further cause the processor to determine a ratio of a number of regions determined as having the first orientation and a number of regions determined as having the second orientation. The processor-executable instructions, when executed by the processor, may further cause the processor to determine a page orientation of the document image as a third orientation or the second orientation if the ratio is greater than a pre-determined threshold or if the number of regions determined as having the first orientation is zero. The processor-executable instructions, when executed by the processor, may further cause the processor to rotate the document image by 90 degrees in counter-clockwise direction if the ratio is less than the pre-determined threshold or if the number of regions determined as having the second orientation is zero. The processor-executable instructions, when executed by the processor, may further cause the processor to determine first optical character recognition (OCR) data by performing OCR of each of the regions of the document image, and second OCR data by performing OCR of each of the regions of the document image rotated by 180 degrees. The processor-executable instructions, when executed by the processor, may further cause the processor to determine a number of correct words in each of the first OCR data and the second OCR data based on a comparison with a dictionary data. The processor-executable instructions, when executed by the processor, may further cause the processor to determine the page orientation as the third orientation if the number of correct words in the first OCR data is greater than the number of correct words in the second OCR data. The processor-executable instructions, when executed by the processor, may further cause the processor to rotate the document image by 180 degrees if the number of correct words in the first OCR data is less than the number of correct words in the second OCR data.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
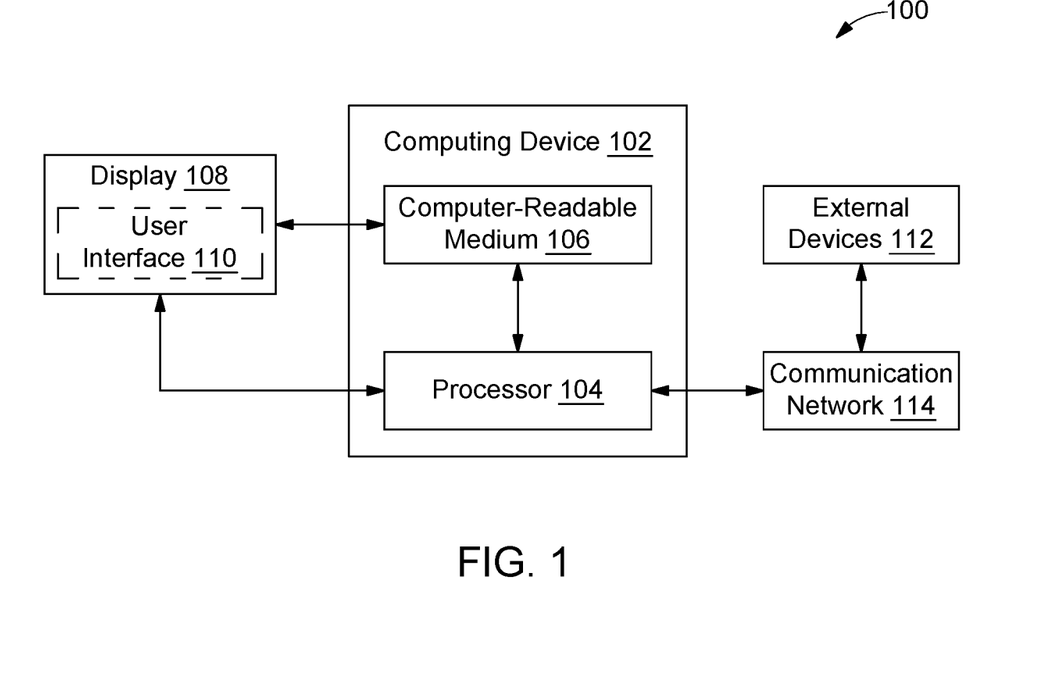
FIG. 1 is a block diagram of an exemplary system for detecting orientation of an input document image, in accordance with some embodiments.

Referring now to FIG. 1, an exemplary system 100 for detecting orientation of an input document image is illustrated, in accordance with some embodiments. The system 100 may implement a computing device 102 (for example, server, desktop, laptop, notebook, netbook, tablet, smartphone, mobile phone, or any other computing device), in accordance with some embodiments of the present disclosure. The computing device 102 may detect orientation of an input page based on an Artificial Intelligence (AI)-based contour detection model and may output the page with corrected orientation.

As will be described in greater detail in conjunction with FIG. 2, FIG. 3 and FIG. 4, the computing device 102 may detect a plurality of regions in an image, each region including text data. The computing device 102 may further determine positional information of each of the regions. The positional information may include x and y coordinates of a top left corner, width and height of each of the plurality of regions. For each of the plurality of regions, the computing device 102 may further determine a region orientation to be one of a first orientation if height of a region is greater than three times width of the region, or a second orientation if the width of the region is greater than three times the height of the region. The computing device 102 may further determine a ratio of a number of regions determined as having the first orientation and a number of regions determined as having the second orientation. The computing device 102 may further determine a page orientation of the image as a third orientation or the second orientation if the ratio is greater than a pre-determined threshold or if the number of regions determined as having the first orientation is zero. The computing device 102 may further rotate the image by 90 degrees in counter-clockwise direction if the ratio is less than the pre-determined threshold or if the number of regions determined as having the second orientation is zero. The computing device 102 may further determine first OCR data by performing OCR of each of the regions of the image, and second OCR data by performing OCR of each of the regions of the image rotated by 180 degrees. The computing device 102 may further determine a number of correct words in each of the first OCR data and the second OCR data based on a comparison with a dictionary data. The computing device 102 may further determine the page orientation as the third orientation if the number of correct words in the first OCR data is greater than the number of correct words in the second OCR data. The computing device 102 may further rotate the image by 180 degrees if the number of correct words in the first OCR data is less than the number of correct words in the second OCR data.

In some embodiments, the computing device 102 may include one or more processors 104 and a computer-readable medium 106 (for example, a memory). The computer-readable medium 106 may include an AI-based contour detection model. Further, the computer-readable medium 106 may store instructions that, when executed by the one or more processors 104, may cause the one or more processors 104 to detect orientation of the input page, in accordance with aspects of the present disclosure. The computer-readable medium 106 may also store various data (for example, positional information, OCR data, count of different region orientations, count of correct words, and the like) that may be captured, processed, and/or required by the system 100.

The system 100 may further include a display 108. The system 100 may interact with a user via a user interface 110 accessible via the display 108. The system 100 may also include one or more external devices 112. In some embodiments, the computing device 102 may interact with the one or more external devices 112 over a communication network 114 for sending or receiving various data. The external devices 112 may include, but may not be limited to, a remote server, a digital device, or another computing system.

Figure 2:
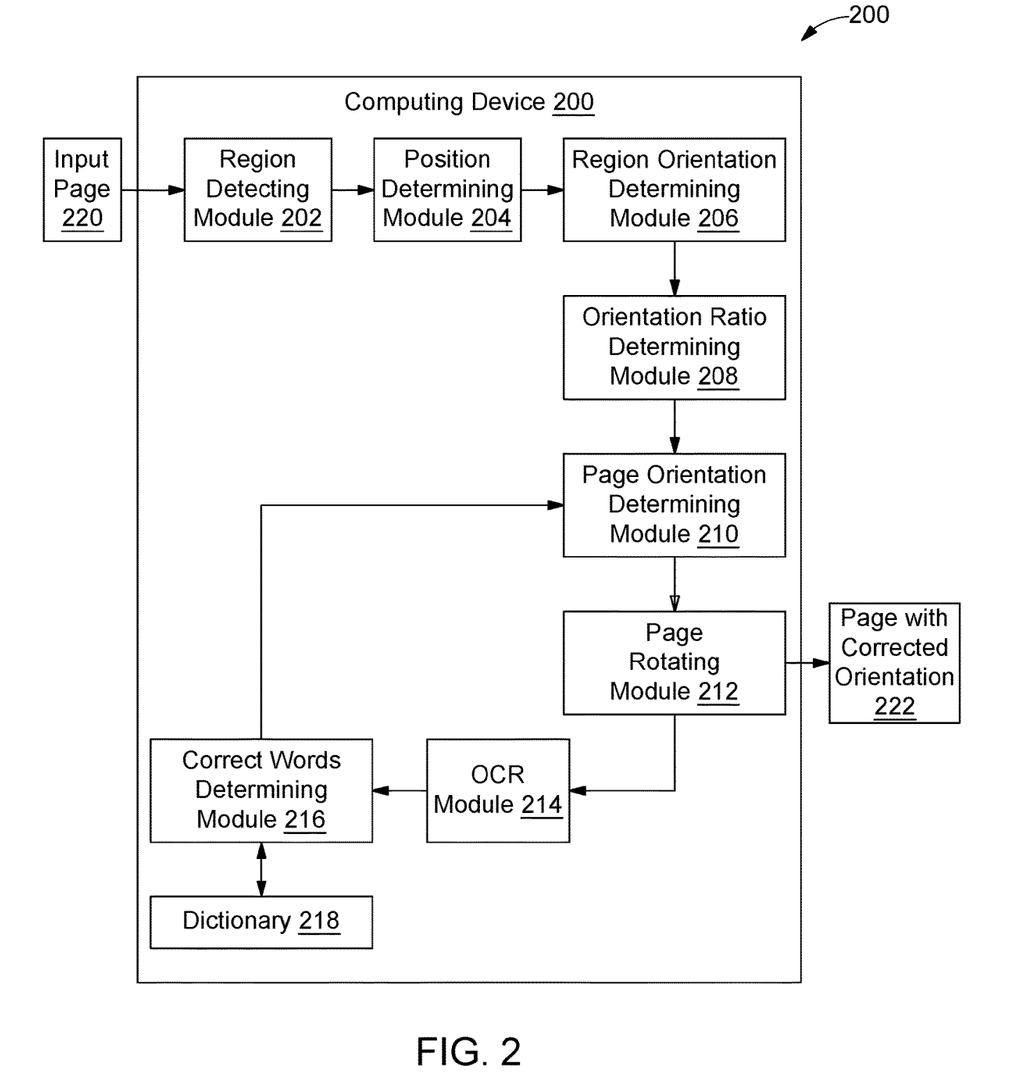
FIG. 2 illustrates a functional block diagram of a computing device implemented by the exemplary system of FIG. 1, in accordance with some embodiments.

Referring now to FIG. 2, a functional block diagram of a computing device 200 (analogous to the computing device 102 implemented by the system 100) is illustrated, in accordance with some embodiments. The computing device

200 may include a region detecting module 202, a position determining module 204, a region orientation determining module 206, an orientation ratio determining module 208, a page orientation determining module 210, a page rotating module 212, an OCR module 214, a correct words determining module 216, and a dictionary 218.

The region detecting module 202 may receive an input image 220 corresponding to a text-containing document. Text in the input image 220 may be at an orientation of one of 0°, 90°, 180°, or 270° with respect to the region detecting module 202. In an exemplary scenario, if orientation of some text regions in the input image 220 is different than the orientation of other regions in the input image 220 (for example, if 10 text regions are oriented at 90° and 20 text regions are oriented at 0°), the computing device 200 may consider the orientation with majority of text regions as the correct text orientation (0° in the aforementioned example).

It should be noted that final text orientation with respect to the computing device 200 needs to be 0° for OCR to accurately recognize the text in the input image 220. Further, the region detecting module 202 may detect a plurality of regions in an image, each region including text data. In some embodiments, a region may correspond to a word in the text-containing document. In other embodiments, the region may correspond to a predefined number of text characters (for example, 3 characters) in continuity. The plurality of regions may be detected through a thresholding technique. Further, the region detecting module 202 may send the input image 220 to the position determining module 204.

The position determining module 204 may determine positional information of each of the plurality of regions. The positional information may include x and y coordinates of a top left corner, width, and height of each of the plurality of regions. Further, the position determining module 204 may send the input image 220 to the region orientation determining module 206. For each of the plurality of regions, the region orientation determining module 206 may determine a region orientation to be one of a first orientation if height of a region is greater than three times width of the region, or a second orientation if the width of the region is greater than three times the height of the region. It should be noted that the region orientation may be determined based on contour detection. In an embodiment, the first orientation may be equal to 90 degrees and the second orientation may be equal to 180 degrees. Further, the region orientation determining module 206 may determine a number of regions with the first orientation and a number of regions with the second orientation in the input image 220. Further, the region orientation determining module 206 may send the input image 220 to the orientation ratio determining module 208.

The orientation ratio determining module 208 may calculate a ratio of the number of regions determined as having the first orientation and the number of regions determined as having the second orientation. Further, the orientation ratio determining module 208 may send the input image 220 to the page orientation determining module 210. The page orientation determining module 210 may determine a page orientation of the image as a third orientation or the second orientation if the ratio is greater than a pre-determined threshold or if the number of regions determined as having the first orientation is zero. In an embodiment, the third orientation may be equal to 0 degrees. The pre-determined threshold may be determined based on an AI-based contour detection model trained based on training data with respect to the first orientation, the second orientation, and the third orientation. In an embodiment, the training data may be determined based on experimental data. In an exemplary embodiment, the pre-defined threshold may be determined as 0.75 based on experimental data. If the ratio is less than the pre-determined threshold or if the number of regions determined as having the second orientation is zero, the page orientation determining module 210 may send the input image 220 to the page rotating module 212.

The page rotating module 212 may rotate the image by 90 degrees in counter-clockwise direction if the ratio is less than the pre-determined threshold or if the number of regions determined as having the second orientation is zero. It may be noted that at this stage, current page orientation of the input image 220 is one of the second orientation or the third orientation. To ascertain which of the second orientation or the third orientation is the current page orientation, the page rotating module 212 may send two copies of the input image 220 to the OCR module 214. First copy is the input image 220 rotated by 180° from the current page orientation and second copy is the input image 220 at the current page orientation.

Further, the OCR module 214 may determine first OCR data by performing OCR of each of the regions of the second copy of the input image 220, and second OCR data by performing OCR of each of the regions of the first copy of the input image 220. Further, the OCR module 214 may send the first OCR data and the second OCR data to the correct words determining module 216. The correct words determining module 216 may determine a number of correct words in each of the first OCR data and the second OCR data based on a comparison with data from the dictionary 218. The dictionary data may include data of one or more languages. By way of an example, the dictionary 218 may be a dictionary of various languages such as English, Hindi, mandarin, etc. The correct words determining module 216 may then send the input image 220 to the page orientation determining module 210.

Further, the page orientation determining module 210 may determine the page orientation as the third orientation if the number of correct words in the first OCR data is greater than the number of correct words in the second OCR data. If the page orientation is determined as the third orientation, the page orientation may be determined as correct and the computing device 200 may output a page with correct orientation 222. Otherwise, the page orientation determining module 210 may send the input image 220 to the page rotating module 212. The page rotating module 212 may then rotate the image by 180 degrees if the number of correct words in the first OCR data is less than the number of correct words in the second OCR data to obtain the page with corrected orientation 222.

It should be noted that all such aforementioned modules 202-218 may be represented as a single module or a combination of different modules. Further, as will be appreciated by those skilled in the art, each of the modules 202-218 may reside, in whole or in parts, on one device or multiple devices in communication with each other. In some embodiments, each of the modules 202-218 may be implemented as dedicated hardware circuit comprising custom application-specific integrated circuit (ASIC) or gate arrays, off-the-shelf semiconductors such as logic chips, transistors, or other discrete components. Each of the modules 202-218 may also be implemented in a programmable hardware device such as a field programmable gate array (FPGA), programmable array logic, programmable logic device, and so forth. Alternatively, each of the modules 202-218 may be implemented in software for execution by various types of processors (e.g., processor 104). An identified module of executable code may, for instance, include one or more physical or logical blocks of computer instructions, which may, for instance, be organized as an object, procedure, function, or other construct. Nevertheless, the executables of an identified module or component need not be physically located together, but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for detecting orientation of input images. For example, the exemplary system 100 and the associated computing device 102 may detect orientation of input images by the processes discussed herein. In particular, as will be appreciated by those of ordinary skill in the art, control logic and/or automated routines for performing the techniques and steps described herein may be implemented by the system 100 and the computing device 102 either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all of the processes described herein may be included in the one or more processors on the system 100.

Figure 3:
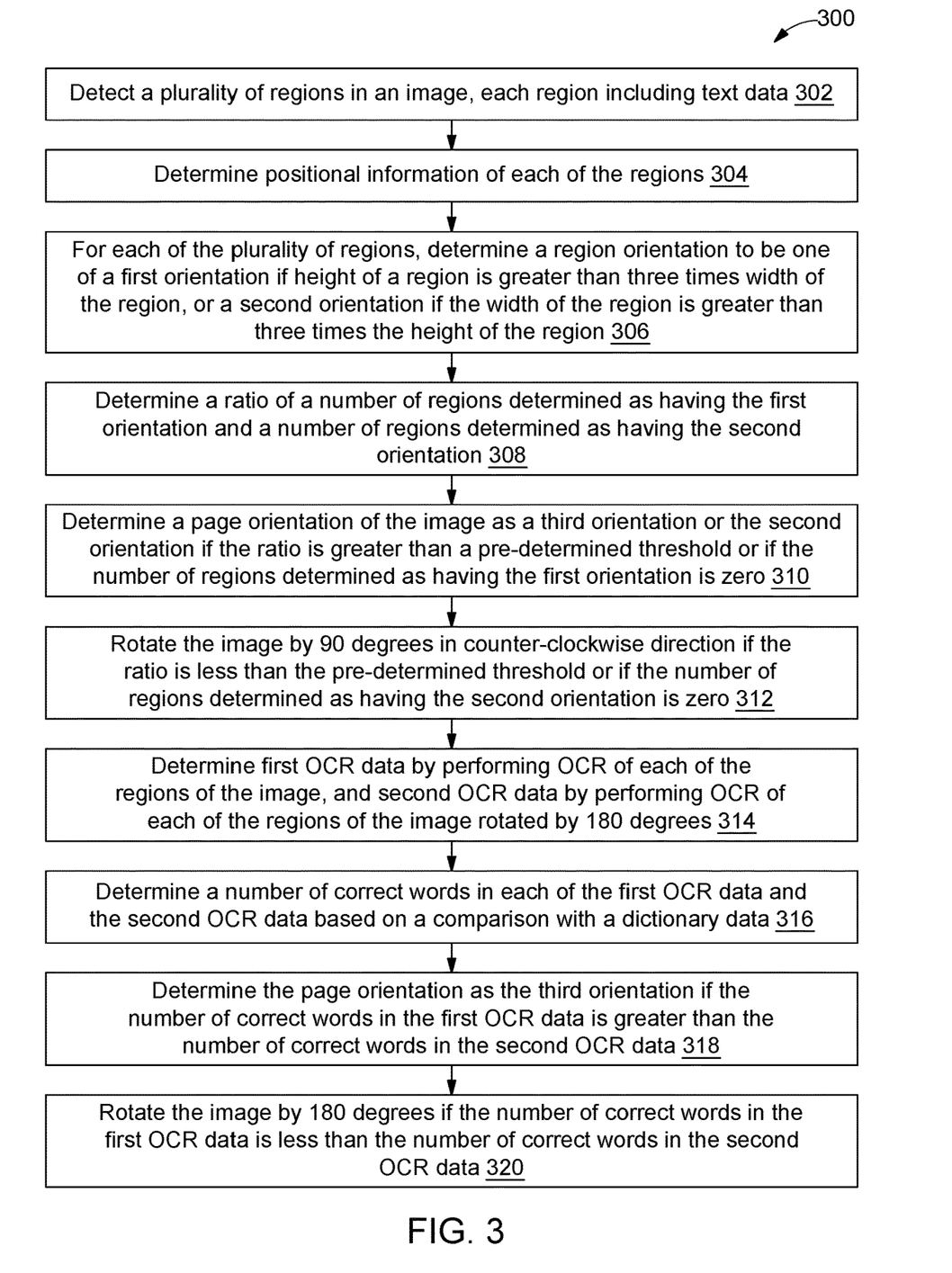
FIG. 3 is a flow diagram of an exemplary control logic for detecting orientation of an input document image, in accordance with some embodiments.

Referring now to FIG. 3, an exemplary control logic 300 for detecting orientation of an input image via a system (such as, the computing device 200) is depicted via a flowchart, in accordance with some embodiments. The control logic 300 may include detecting, by the region detecting module 202, a plurality of regions in an image, each region including text data, at step 302. Further, the control logic 300 may include determining, by the position determining module 204, positional information of each of the regions, at step 304. The positional information may include x and y coordinates of a top left corner, width, and height of each of the plurality of regions.

Further, for each of the plurality of regions, the control logic 300 may include determining, by the region orientation determining module 206, a region orientation to be one of a first orientation if height of a region is greater than three times width of the region, or a second orientation if the width of the region is greater than three times the height of the region, at step 306. It should be noted that the region orientation may be determined based on contour detection. In an embodiment, the first orientation is equal to 90 degrees and the second orientation is equal to 180 degrees.

Further, the control logic 300 may include determining, by the orientation ratio determining module 208, a ratio of a number of regions determined as having the first orientation and a number of regions determined as having the second orientation, at step 308. Further, the control logic 300 may include determining, by the page orientation determining module 210, a page orientation of the image as a third orientation or the second orientation if the ratio is greater than a pre-determined threshold or if the number of regions determined as having the first orientation is zero, at step 310. In an embodiment, the third orientation is equal to 0 degrees. The pre-determined threshold may be determined based on an AI-based contour detection model trained based on training data with respect to the first orientation, the second orientation, and the third orientation.

Further, the control logic 300 may include rotating, by the page rotating module 212, the image by 90 degrees in counter-clockwise direction if the ratio is less than the pre-determined threshold or if the number of regions determined as having the second orientation is zero, at step 312. Further, the control logic 300 may include determining, by the OCR module 214, first OCR data by performing OCR of each of the regions of the image, and second OCR data by performing OCR of each of the regions of the image rotated by 180 degrees, at step 314. Further, the control logic 300 may include determining, by the correct words determining module 216, a number of correct words in each of the first OCR data and the second OCR data based on a comparison with dictionary data corresponding to the dictionary 218, at step 316. It may be noted that the dictionary data may include data of one or more languages.

Further, the control logic 300 may include determining, by the page orientation determining module 210, the page orientation as the third orientation if the number of correct words in the first OCR data is greater than the number of correct words in the second OCR data, at step 318. Further, the control logic 300 may include rotating, by the page rotating module 212, the image by 180 degrees if the number of correct words in the first OCR data is less than the number of correct words in the second OCR data, at step 320.

Figure 4:
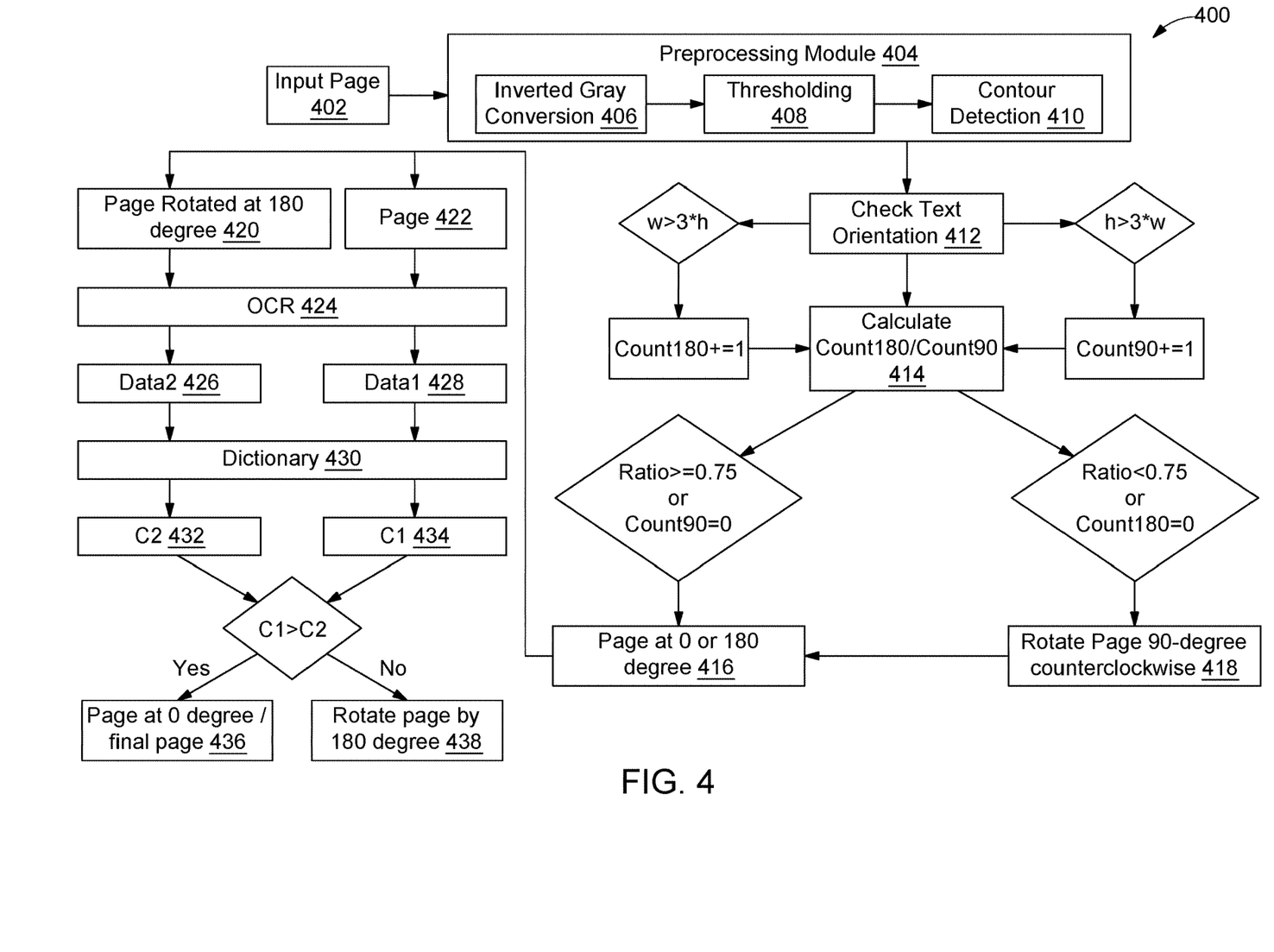
FIG. 4 is a flow diagram of detailed exemplary control logic for detecting orientation of an input document image, in accordance with some embodiments.

Referring now to FIG. 4, a detailed exemplary control logic 400 for detecting orientation of an input image 402 via a system (such as, the computing device 200) is depicted via a flowchart, in accordance with some embodiments. The input image 402 may include text data. The input image 402 may be received by a preprocessing module 404. At step 406, the control logic 400 may include performing inverted gray conversion of the input image 402 via the preprocessing module 404. Further, at step 408, the control logic 400 may include performing thresholding via the preprocessing module 404 to identify a plurality of regions in the input image 402. In an embodiment, the steps 406 and 408 may be performed by the region detecting module 202. Further, for each of the plurality of regions, at step 410, the control logic 400 may include performing contour detection via the preprocessing module 404 to determine positional information (including x and y coordinates of a top left corner, width, and height) and to identify region orientation. It may be noted that a region may correspond to a word in the text data. As will be appreciated, a word may include one or more text characters. In an embodiment, the step 410 may be performed by the position determining module 204.

Further, at step 412, the control logic 400 may include checking text orientation. If the height of a region is greater than thrice the width of the region (i.e., h>3*w), the text orientation may be determined to be 90° and count90 (i.e., number of words with a 90° orientation or a vertical orientation) will be increased by 1. If the width of a region is greater than thrice the height of the region (i.e., w>3*h), the text orientation may be determined to be 180° and count180 (i.e., number of words with a 180° orientation or a horizontal orientation) will be increased by 1. In an embodiment, the step 412 may be performed by the region orientation determining module 206.

Further, at step 414, the control logic 400 may include calculating a ratio of count180 to count90 (i.e., count180/count90). In an embodiment, the steps 414 may be performed by the orientation ratio determining module 208. If the ratio is greater than or equal to 0.75 or if count90 is equal to zero, at step 416 of the control logic 400, page orientation of the image may be determined to be one of zero or 180°. In an embodiment, the step 416 may be performed by the page orientation determining module 210. If the ratio is less than 0.75 or if count180 is equal to zero, page orientation of the image may be determined to be one of 90° or 270° and, at step 418 of the control logic 400, the page may be rotated by 90° in a counter-clockwise direction to obtain a page with an orientation of zero or 180°. In an embodiment, rotation of the page may be performed by the page rotating module 212.

Further, after obtaining a page with horizontal orientation (i.e., one of zero or 180°) of characters, two copies of the page may be created—a first copy (i.e., page rotated at 180° 420) obtained by rotating the page by 180° and a second copy (i.e., page 422) obtained by keeping the page at original orientation. The two copies may be further validated to accurately determine the orientation and to rectify the orientation in case of an erroneous orientation.

To validate the page orientation, step 424 of the control logic 400 may include performing an OCR to obtain data2 426 and data1 428 corresponding to the first copy and the second copy, respectively. In an embodiment, the step 424 may be performed by the OCR module 214. Further, the computing device 200 may compare each of the data2 426 and the data1 428 with a dictionary 430 via the correct words determining module 216. It may be noted that any other dictionary may be selected for the comparison based on a language of the text in the page. Further, based on the comparison, C2 432 (i.e., number of correct words in the data2 426) and C1 434 (i.e., number of correct words in the data1 428) may be obtained. If C1 434 is greater than C2 432, the page orientation may be determined to be 0° (i.e., correct orientation) by the page orientation determining module 210, at step 436. If C2 432 is greater than C1 434, the page orientation may be determined to be 180° by the page orientation determining module 210 and the page may be rotated by 180° by the page rotating module 212 to obtain a page with corrected orientation, at step 436.

As will be also appreciated, the above-described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 5:
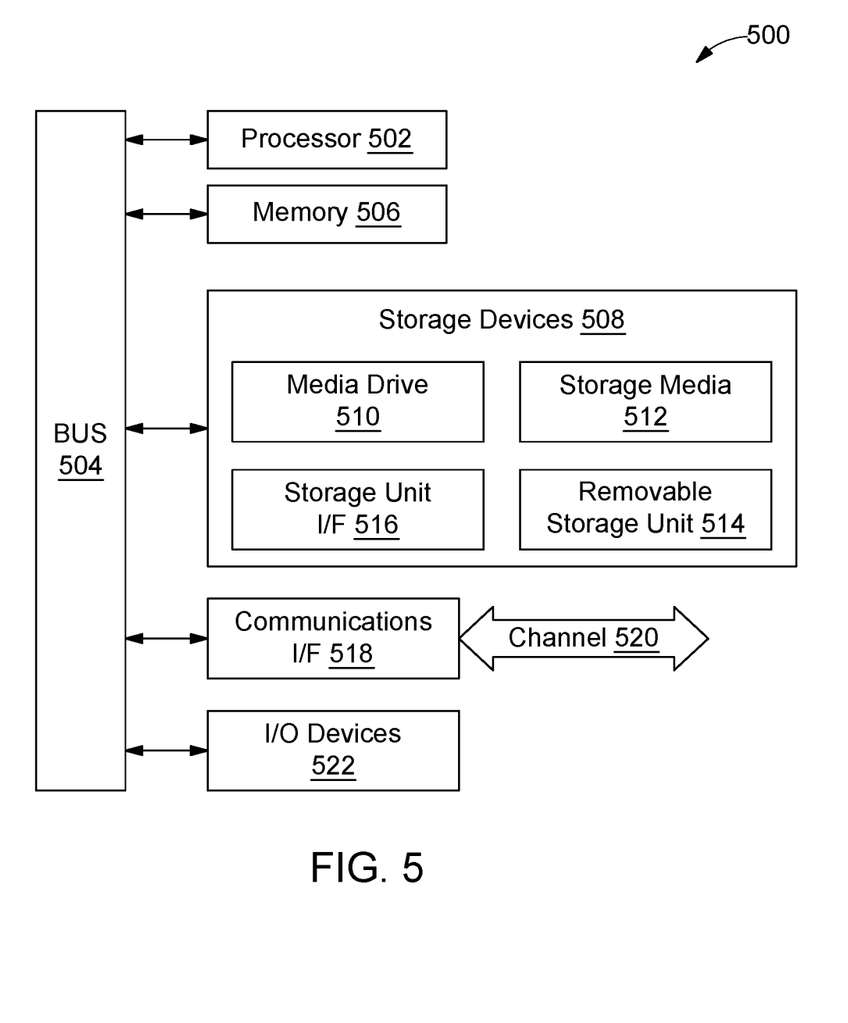
FIG. 5 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 5, an exemplary computing system 500 that may be employed to implement processing functionality for various embodiments (e.g., as a SIMD device, client device, server device, one or more processors, or the like) is illustrated. Those skilled in the relevant art will also recognize how to implement the invention using other computer systems or architectures. The computing system 500 may represent, for example, a user device such as a desktop, a laptop, a mobile phone, personal entertainment device, DVR, and so on, or any other type of special or general-purpose computing device as may be desirable or appropriate for a given application or environment. The computing system 500 may include one or more processors, such as a processor 502 that may be implemented using a general or special purpose processing engine such as, for example, a microprocessor, microcontroller or other control logic. In this example, the processor 502 is connected to a bus 504 or other communication medium. In some embodiments, the processor 502 may be an Artificial Intelligence (AI) processor, which may be implemented as a Tensor Processing Unit (TPU), or a graphical processor unit, or a custom programmable solution Field-Programmable Gate Array (FPGA).

The computing system 500 may also include a memory 506 (main memory), for example, Random Access Memory (RAM) or other dynamic memory, for storing information and instructions to be executed by the processor 502. The memory 506 also may be used for storing temporary variables or other intermediate information during execution of instructions to be executed by the processor 502. The computing system 500 may likewise include a read only memory ("ROM") or other static storage device coupled to bus 504 for storing static information and instructions for the processor 502.

The computing system 500 may also include a storage devices 508, which may include, for example, a media drive 510 and a removable storage interface. The media drive 510 may include a drive or other mechanism to support fixed or removable storage media, such as a hard disk drive, a floppy disk drive, a magnetic tape drive, an SD card port, a USB port, a micro USB, an optical disk drive, a CD or DVD drive (R or RW), or other removable or fixed media drive. A storage media 512 may include, for example, a hard disk, magnetic tape, flash drive, or other fixed or removable medium that is read by and written to by the media drive 510. As these examples illustrate, the storage media 512 may include a computer-readable storage medium having stored therein particular computer software or data.

In alternative embodiments, the storage devices 508 may include other similar instrumentalities for allowing computer programs or other instructions or data to be loaded into the computing system 500. Such instrumentalities may include, for example, a removable storage unit 514 and a storage unit interface 516, such as a program cartridge and cartridge interface, a removable memory (for example, a flash memory or other removable memory module) and memory slot, and other removable storage units and interfaces that allow software and data to be transferred from the removable storage unit 514 to the computing system 500.

The computing system 500 may also include a communications interface 518. The communications interface 518 may be used to allow software and data to be transferred between the computing system 500 and external devices. Examples of the communications interface 518 may include a network interface (such as an Ethernet or other NIC card), a communications port (such as for example, a USB port, a micro USB port), Near field Communication (NFC), etc. Software and data transferred via the communications interface 518 are in the form of signals which may be electronic, electromagnetic, optical, or other signals capable of being received by the communications interface 518. These signals are provided to the communications interface 518 via a channel 520. The channel 520 may carry signals and may be implemented using a wireless medium, wire or cable, fiber optics, or other communications medium. Some examples of the channel 520 may include a phone line, a cellular phone link, an RF link, a Bluetooth link, a network interface, a local or wide area network, and other communications channels.

The computing system 500 may further include Input/Output (I/O) devices 522. Examples may include, but are not limited to a display, keypad, microphone, audio speakers, vibrating motor, LED lights, etc. The I/O devices 522 may receive input from a user and also display an output of the computation performed by the processor 502. In this document, the terms "computer program product" and "computer-readable medium" may be used generally to refer to media such as, for example, the memory 506, the storage devices 508, the removable storage unit 514, or signal(s) on the channel 520. These and other forms of computer-readable media may be involved in providing one or more sequences of one or more instructions to the processor 502 for execution. Such instructions, generally referred to as "computer program code" (which may be grouped in the form of computer programs or other groupings), when executed, enable the computing system 500 to perform features or functions of embodiments of the present invention.

In an embodiment where the elements are implemented using software, the software may be stored in a computer-readable medium and loaded into the computing system 500 using, for example, the removable storage unit 514, the media drive 510 or the communications interface 518. The control logic (in this example, software instructions or computer program code), when executed by the processor 502, causes the processor 502 to perform the functions of the invention as described herein.

Thus, the disclosed method and system try to overcome the technical problem of detecting orientation of input images. The method and system provide means to detect and rectify text orientation in the input images to allow for accurate OCR detection of text data in the input images. Further, the method and system may determine text orientation in the input images with high accuracy. Further, the method and system are light on computational resources.

As will be appreciated by those skilled in the art, the techniques described in the various embodiments discussed above are not routine, or conventional, or well understood in the art. The techniques discussed above provide for detecting orientation of input images. The techniques first detect a plurality of regions in an image, each region including text data. The techniques may then determine positional information of each of the regions. The positional information may include x and y coordinates of a top left corner, width and height of each of the plurality of regions. For each of the plurality of regions, the techniques may then determine a region orientation to be one of a first orientation if height of a region is greater than three times width of the region, or a second orientation if the width of the region is greater than three times the height of the region. The techniques may then determine a ratio of a number of regions determined as having the first orientation and a number of regions determined as having the second orientation. The techniques may then determine a page orientation of the image as a third orientation or the second orientation if the ratio is greater than a pre-determined threshold or if the number of regions determined as having the first orientation is zero. The techniques may then rotate the image by 90 degrees in counter-clockwise direction if the ratio is less than the pre-determined threshold or if the number of regions determined as having the second orientation is zero. The techniques may then determine first OCR data by performing OCR of each of the regions of the image, and second OCR data by performing OCR of each of the regions of the image rotated by 180 degrees. The techniques may then determine a number of correct words in each of the first OCR data and the second OCR data based on a comparison with a dictionary data. The techniques may then determine the page orientation as the third orientation if the number of correct words in the first OCR data is greater than the number of correct words in the second OCR data. The techniques may then rotate the image by 180 degrees if the number of correct words in the first OCR data is less than the number of correct words in the second OCR data.

In light of the above-mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

The specification has described method and system for detecting orientation of input images. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of detecting orientation of a document image, comprising:
   detecting, by a computing device, a plurality of regions in the document image, each region comprising text data;
   determining, by the computing device, positional information of each of the regions, wherein the positional information comprises x and y coordinates of a top left corner and width and height of each of the plurality of regions;

for each of the plurality of regions:
  determining, by the computing device, a region orientation to be one of:
    a first orientation if height of a region is greater than three times width of the region, wherein the first orientation is equal to 90 degrees, or
    a second orientation if the width of the region is greater than three times the height of the region, wherein the second orientation is equal to 180 degrees;
  determining, by the computing device, a ratio of a number of regions determined as having the second orientation to a number of regions determined as having the first orientation;
  determining, by the computing device, a page orientation of the document image as a third orientation or the second orientation if the ratio is greater than a pre-determined threshold or if the number of regions determined as having the first orientation is zero;
  wherein the third orientation is equal to 0 degree; and
  wherein the ratio is computed if the number of regions determined as having the first orientation is non-zero and if the number of regions determined as having the first orientation is zero, the page orientation is determined as the third orientation or the second orientation without computing the ratio;
  rotating, by the computing device, the document image by 90 degrees in counter-clockwise direction if the ratio is less than the pre-determined threshold or if the number of regions determined as having the second orientation is zero;
  determining, by the computing device:
    a first OCR data by performing optical character recognition (OCR) of each of the regions of the document image, and
    a second OCR data by performing optical character recognition (OCR) of each of the regions of the document image rotated by 180 degrees;
  determining, by the computing device, a number of correct words in each of the first OCR data and the second OCR data based on a comparison with a dictionary data;
  determining, by the computing device, the page orientation as the third orientation if the number of correct words in the first OCR data is greater than the number of correct words in the second OCR data; and
  rotating, by the computing device, the document image by 180 degrees if the number of correct words in the first OCR data is less than the number of correct words in the second OCR data.

2. The method of claim 1, wherein the region orientation is determined based on contour detection.

3. The method of claim 1, wherein the dictionary data comprises data of one or more languages.

4. The method of claim 1, wherein the pre-determined threshold is determined based on an AI-based contour detection model trained based on training data with respect to the first orientation, the second orientation and the third orientation.

5. A system to detect and correct orientation of a document image, comprising:
  one or more processors;
  a memory communicatively coupled to the processors, wherein the memory stores a plurality of processor-executable instructions, which, upon execution, cause the processors to:
    detect a plurality of regions in the document image, each region comprising text data;
    determine positional information of each of the regions, wherein the positional information comprises x and y coordinates of a top left corner and width and height of each of the plurality of regions;
    for each of the plurality of regions:
      determine a region orientation to be one of:
        a first orientation if height of a region is greater than three times width of the region, wherein the first orientation is equal to 90 degrees, or
        a second orientation if the width of the region is greater than three times the height of the region, wherein the second orientation is equal to 180 degrees;
      determine a ratio of a number of regions determined as having the second orientation to a number of regions determined as having the first orientation;
      determine a page orientation of the document image as a third orientation or the second orientation if the ratio is greater than a pre-determined threshold or if the number of regions determined as having the first orientation is zero;
      wherein the third orientation is equal to 0 degree; and
      wherein the ratio is computed if the number of regions determined as having the first orientation is non-zero and if the number of regions determined as having the first orientation is zero, the page orientation is determined as the third orientation or the second orientation without computing the ratio;
    rotate the document image by 90 degrees in counter-clockwise direction if the ratio is less than the pre-determined threshold or if the number of regions determined as having the second orientation is zero;
    determine:
      a first OCR data by performing optical character recognition (OCR) of each of the regions of the document image, and
      a second OCR data by performing optical character recognition (OCR) of each of the regions of a rotated document image rotated by 180 degrees;
    determine a number of correct words in each of the first OCR data and the second OCR data based on a comparison with a dictionary data;
    determine the page orientation as the third orientation if the number of correct words in the first OCR data is greater than the number of correct words in the second OCR data; and
    rotate the document image by 180 degrees if the number of correct words in the first OCR data is less than the number of correct words in the second OCR data.

6. The system of claim 5, wherein the region orientation is determined based on contour detection.

7. The system of claim 5, wherein the dictionary data comprises data of one or more languages.

8. The system of claim 5, wherein the pre-determined threshold is determined based on an AI-based contour detection model trained based on training data with respect to the first orientation, the second orientation and the third orientation.

9. A non-transitory computer-readable medium storing computer-executable instructions for detecting orientation of a document image, the computer-executable instructions configured for:
  detecting a plurality of regions in the document image, each region comprising text data;
  determining positional information of each of the regions, wherein the positional information comprises x and y coordinates of a top left corner and width and height of each of the plurality of regions;
  for each of the plurality of regions:
    determining a region orientation to be one of:
      a first orientation if height of a region is greater than three times width of the region, wherein the first orientation is equal to 90 degrees, or
      a second orientation if the width of the region is greater than three times the height of the region, wherein the second orientation is equal to 180 degrees;
  determining a ratio of a number of regions determined as having the second orientation to a number of regions determined as having the first orientation;
  determining a page orientation of the document image as a third orientation or the second orientation if the ratio is greater than a pre-determined threshold or if the number of regions determined as having the first orientation is zero;
    wherein the third orientation is equal to 0 degree; and
    wherein the ratio is computed if the number of regions determined as having the first orientation is non-zero and if the number of regions determined as having the first orientation is zero, the page orientation is determined as the third orientation or the second orientation without computing the ratio;
  rotating the document image by 90 degrees in counter-clockwise direction if the ratio is less than the pre-determined threshold or if the number of regions determined as having the second orientation is zero;
  determining:
    a first OCR data by performing optical character recognition (OCR) of each of the regions of the document image, and
    a second OCR data by performing optical character recognition (OCR) of each of the regions of the document image rotated by 180 degrees;
    determining a number of correct words in each of the first OCR data and the second OCR data based on a comparison with a dictionary data;
    determining the page orientation as the third orientation if the number of correct words in the first OCR data is greater than the number of correct words in the second OCR data; and
    rotating the document image by 180 degrees if the number of correct words in the first OCR data is less than the number of correct words in the second OCR data.

10. The non-transitory computer-readable medium of claim 9, wherein the region orientation is determined based on contour detection.

11. The non-transitory computer-readable medium of claim 9, wherein the dictionary data comprises data of one or more languages.

12. The non-transitory computer-readable medium of claim 9, wherein the pre-determined threshold is determined based on an AI-based contour detection model trained based on training data with respect to the first orientation, the second orientation and the third orientation.

* * * * *